(12) United States Patent
Han et al.

(10) Patent No.: US 12,517,601 B2
(45) Date of Patent: Jan. 6, 2026

(54) ELECTRONIC DEVICE WITH IMPROVED LIFE SPAN OF PIXELS

(71) Applicant: Samsung Display Co., Ltd., Yongin-si (KR)

(72) Inventors: Hyeyun Han, Yongin-si (KR); Wonkyu Kwak, Yongin-si (KR); Gyeongnam Bang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/649,348

(22) Filed: Apr. 29, 2024

(65) Prior Publication Data

US 2025/0021178 A1   Jan. 16, 2025

(30) Foreign Application Priority Data

Jul. 10, 2023  (KR) .................. 10-2023-0089377

(51) Int. Cl.
  *G06F 3/041* (2006.01)
  *G06F 3/044* (2006.01)
  *H10K 59/40* (2023.01)

(52) U.S. Cl.
  CPC .......... *G06F 3/0412* (2013.01); *G06F 3/0446* (2019.05); *H10K 59/40* (2023.02); *G06F 2203/04111* (2013.01); *G06F 2203/04112* (2013.01)

(58) Field of Classification Search
  CPC ................. G06F 3/0412; G06F 3/0446; G06F 2203/04111; G06F 2203/04112; H10K 59/40
  See application file for complete search history.

(56) References Cited

U.S. PATENT DOCUMENTS

| | | | |
|---|---|---|---|
| 9,871,082 B2 | 1/2018 | Jeon | |
| 11,216,130 B2 | 1/2022 | Tan et al. | |
| 11,714,515 B2 | 8/2023 | Choi | |
| 2021/0004123 A1* | 1/2021 | Tan | ........................ G06F 3/0412 |
| 2021/0200364 A1* | 7/2021 | Won | ........................ G06F 3/0412 |

FOREIGN PATENT DOCUMENTS

| | | |
|---|---|---|
| CN | 108762542 A | 11/2018 |
| KR | 10-2061108 B1 | 1/2020 |
| KR | 10-2022-0042888 A | 4/2022 |

* cited by examiner

*Primary Examiner* — Lisa S Landis
(74) *Attorney, Agent, or Firm* — Womble Bond Dickinson (US) LLP

(57) ABSTRACT

Provided is an electronic device including a display layer having pixels, and a sensor layer having a sensing electrode, wherein the pixels may include a first pixel group and a second pixel group, the first pixel group may include a (1-1)-th sub pixel, a (1-2)-th sub pixel spaced apart from the (1-1)-th sub pixel at a first distance, and a (1-3)-th sub pixel, the second pixel group may include a (2-1)-th sub pixel, a (2-2)-th sub pixel spaced apart from the (2-1)-th sub pixel at the first distance, and a (2-3)-th sub pixel, the (1-1)-th sub pixel and the (2-2)-th sub pixel may be adjacent to each other, and may be spaced apart from each other at a second distance different from the first distance.

20 Claims, 8 Drawing Sheets

ELECTRONIC DEVICE WITH IMPROVED LIFE SPAN OF PIXELS

CROSS-REFERENCE TO RELATED APPLICATIONS

The present application claims priority to, and the benefit of, Korean Patent Application No. 10-2023-0089377, filed on Jul. 10, 2023, in the Korean Intellectual Property Office, the content of which in its entirety is herein incorporated by reference.

BACKGROUND

1. Field

The present disclosure herein relates to an electronic device with improved life span of a plurality of pixels.

2. Description of Related Art

An organic light-emitting electronic device includes two electrodes and a light-emitting layer positioned therebetween. An electron injected from one electrode, and a hole injected from the other electrode, combine in the light-emitting layer to form an exciton, and light is emitted when the exciton releases energy.

A plurality of light-emitting layers, respectively displaying red, green, and blue colors, may express full color, and at this time, may have a striped structure in which the light-emitting layers displaying the same color are arranged in a row.

SUMMARY

The present disclosure provides an electronic device having improved life span of a plurality of pixels.

One or more embodiments of the present disclosure provide an electronic device including a display layer including pixels including a first pixel group and a second pixel group, and a sensor layer above the display layer, and including a sensing electrode, wherein the first pixel group includes a (1-1)-th sub pixel configured to emit first light, a (1-2)-th sub pixel spaced apart from the (1-1)-th sub pixel at a first distance in a second direction, and configured to emit second light that is different from the first light, and a (1-3)-th sub pixel spaced apart from each of the (1-1)-th sub pixel and the (1-2)-th sub pixel at the first distance in a first direction crossing the second direction, and configured to emit third light that is different from the first light and the second light, wherein the second pixel group includes a (2-1)-th sub pixel configured to emit the first light, a (2-2)-th sub pixel adjacent the (1-1)-th pixel in the second direction, spaced apart from the (1-1)-th pixel at a second distance that is different from the first distance, spaced apart from the (2-1)-th sub pixel at the first distance in the second direction, and configured to emit the second light, and a (2-3)-th sub pixel spaced apart from each of the (2-1)-th sub pixel and the (2-2)-th sub pixel at the first distance in the first direction, and configured to emit the third light.

The first distance may be less than the second distance.

The sensing electrode may include a first mesh line having a mesh structure, and surrounding the first pixel group and the second pixel group, and a second mesh line electrically connected to the first mesh line, between the first pixel group and the second pixel group, and extending in the first direction.

The first mesh line may have a same electrode width as the second mesh line, which is less than the first distance.

When viewed on a plane, the first mesh line and the second mesh line might not overlap the first pixel group or the second pixel group.

The first mesh line may include a (1-1)-th protruding part which, on a plane, is between the (1-1)-th sub pixel and the (1-2)-th sub pixel, and protrudes in the first direction.

The first mesh line may further include a (1-2)-th protruding part, which, on the plane, is between the (2-1)-th sub pixel and the (2-2)-th sub pixel, and protrudes in the first direction.

The second mesh line may include a (2-1)-th protruding part, which, on the plane, is between the (1-1)-th sub pixel and the (1-3)-th sub pixel, and protrudes in the second direction.

The second mesh line may further include a (2-2)-th protruding part, which, on the plane, is between the (2-2)-th sub pixel and the (2-3)-th sub pixel, and protrudes in an opposite direction of the second direction.

The (1-1)-th protruding part may have a same length as the (1-2)-th protruding part, wherein the (2-1)-th protruding part has a same length as the (2-2)-th protruding part.

When viewed on a plane, the first mesh line and the second mesh line might not be between the (1-2)-th sub pixel and the (1-3)-th sub pixel.

When viewed on a plane, the first mesh line and the second mesh line might not be between the (2-1)-th sub pixel and the (2-3)-th sub pixel.

The sensing electrode may further include a third mesh line electrically connected to the first mesh line in the second direction, wherein, when viewed on a plane, the third mesh line overlaps at least a portion of the first pixel group and at least a portion of the second pixel group.

The sensing electrode may further include a fourth mesh line electrically connected to the first mesh line in the first direction, wherein, when viewed on a plane, the fourth mesh line overlaps at least a portion of the first pixel group.

The sensing electrode may further include a fifth mesh line electrically connected to the first mesh line in the first direction, wherein, when viewed on a plane, the fifth mesh line overlaps at least a portion of the second pixel group.

The sensing electrode may further include an auxiliary electrode electrically connected to the first mesh line, wherein, when viewed on a plane, the auxiliary electrode overlaps at least a portion among the first pixel group, the second pixel group, or the second mesh line.

The auxiliary electrode may have a zigzag shape.

The auxiliary electrode may include a transparent material.

The (1-1)-th sub pixel may have an area that is less than an area of the (1-2)-th sub pixel, which is less than an area of the (1-3)-th sub pixel.

The (2-1)-th sub pixel may have an area that is less than an area of the (2-2)-th sub pixel, which is less than an area of the (2-3)-th sub pixel.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
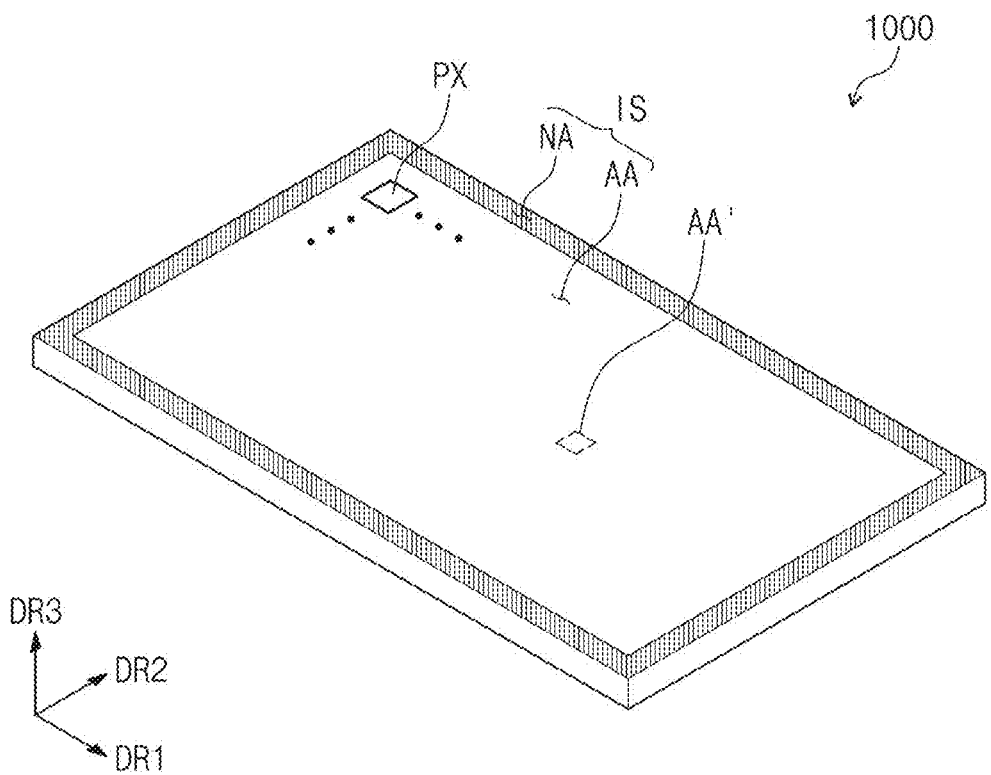
FIG. 1 is a perspective view of an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
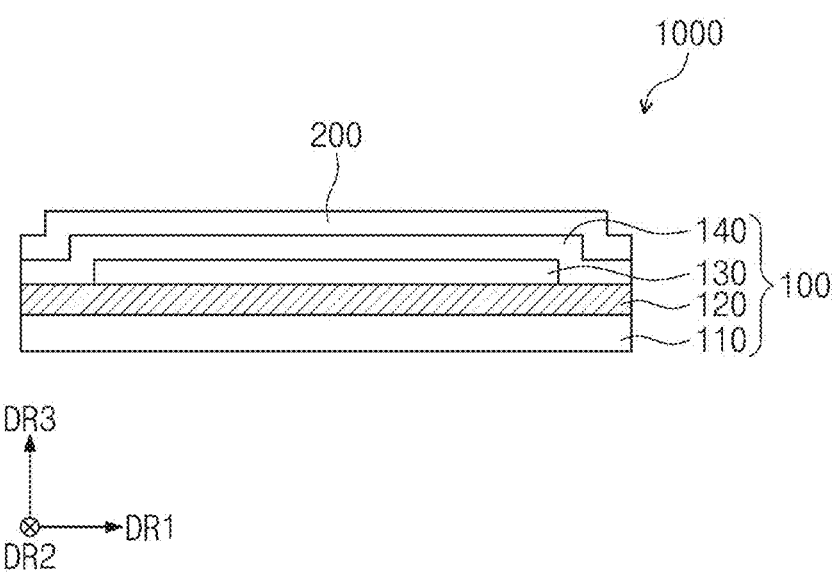
FIG. 2 is a cross-sectional view of an electronic device according to one or more embodiments of the present disclosure.

FIG. 1 is a perspective view of an electronic device according to one or more embodiments of the present disclosure, and FIG. 2 is a cross-sectional view of an electronic device according to one or more embodiments of the present disclosure.

Referring to FIGS. 1 and 2, an electronic device 1000 may substantially generate an image. The electronic device 1000 may be an emission-type electronic device or a light-receiving-type electronic device. For example, the electronic device 1000 may be any one among an organic light-emitting electronic device, a quantum-dot light-emitting electronic device, a micro-LED electronic device, a nano-LED electronic device, a liquid crystal electronic device, an electrophoretic electronic device, an electrowetting electronic device, and a MEMS electronic device, and is not limited particularly thereto.

The electronic device 1000 may include a display layer 100 and a sensor layer 200 located on the display layer 100.

The electronic device 1000 may display an image through a display surface IS. The display surface IS may be parallel to a surface defined by a first direction DR1 and a second direction DR2. The display surface IS may include an active region AA and a peripheral region NA. A pixel PX may be located in the active region AA, and the pixel PX may not be located in the peripheral region NA. The peripheral region NA may be defined along a border of the display surface IS. The peripheral region NA may surround the active region AA. According to one or more embodiments of the present disclosure, the peripheral region NA may be omitted, or may be located only one side of the active region AA.

The normal direction of the display surface IS, which is the thickness direction of the electronic device 1000, may be indicated by a third direction DR3. A front surface (or upper surface) and a rear surface (or lower surface) of each of layers or units, described hereinafter, may be distinguished on the basis of the third direction DR3.

According to one or more embodiments of the present disclosure, the electronic device 1000 having the flat display surface IS is illustrated, but one or more embodiments of the present disclosure is not limited thereto. The electronic device 1000 may include a curved display surface or a three-dimensional display surface. The three-dimensional display surface may include a plurality of display regions indicating different directions.

The display layer 100 according to one or more embodiments of the present disclosure may be an emission-type display layer, but is not limited particularly thereto. For example, the display layer 100 may include an organic light-emitting display layer, a quantum-dot display layer, a micro-LED display layer, or a nano-LED display layer. A light-emitting layer of the organic light-emitting display layer may include an organic light-emitting material. A light-emitting layer of the quantum-dot display layer may include quantum dots, quantum rods, and the like. A light-emitting layer of the micro-LED display layer may include a micro LED. A light-emitting layer of the nano-LED display layer may include a nano LED.

The display layer 100 may include a base layer 110, a circuit layer 120, a light-emitting element layer 130, and an encapsulation layer 140.

The base layer 110 may provide a surface on which the circuit layer 120 is located. The base layer 110 may be a glass substrate, a metal substrate, or a polymer substrate. However, one or more embodiments of the present disclosure is not limited thereto, and the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer located on the first synthetic resin layer, an amorphous silicon (a-Si) layer located on the silicon oxide ($SiO_x$) layer, and a second synthetic resin layer located on the amorphous silicon (a-Si) layer. The silicon oxide ($SiO_x$) layer and the amorphous silicon (a-Si) layer may be referred to as a base barrier layer.

The first and second synthetic resin layers may each include a polyimide-based resin. In addition, the first and second synthetic resin layers may each include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. Meanwhile, in this specification, the term "~~-based resin" refers to the inclusion of the functional group of "~~".

The circuit layer 120 may be located on the base layer 110. The circuit layer 120 may include an insulation layer, a semiconductor pattern, a conductive pattern, a signal line, and the like. The insulation layer, a semiconductor layer, and a conductive layer may be formed on the base layer 110 through a coating, deposition, etc., and then the insulation layer, the semiconductor layer, and the conductive layer may be selectively patterned through a plurality of cycles of a photolithography process. After this, the semiconductor pattern, the conductive pattern, and the signal line, included in the circuit layer 120, may be formed.

The light-emitting element layer 130 may be located on the circuit layer 120. The light-emitting element layer 130 may include a light-emitting element. For example, the light-emitting element layer 130 may include an organic light-emitting material, quantum dots, quantum rods, a micro LED, or a nano LED.

The encapsulation layer 140 may be located on the light-emitting element layer 130. The encapsulation layer 140 may protect the light-emitting element layer 130 from moisture, oxygen, and foreign substances such as dust particles.

The sensor layer 200 may be formed on the display layer 100 through a continuous process. In this case, the sensor layer 200 may be directly located on the display layer 100. "Directly located" may mean that there is no intervening component therebetween (e.g., no intervening component between the sensor layer 200 and the display layer 100). That is, there may be no separate adhesion member located between the sensor layer 200 and the display layer 100. Alternatively, the sensor layer 200 may be bonded to the display layer 100 through an adhesion member. The adhesion member may include a general adhesive or gluing agent.

Figure 3:
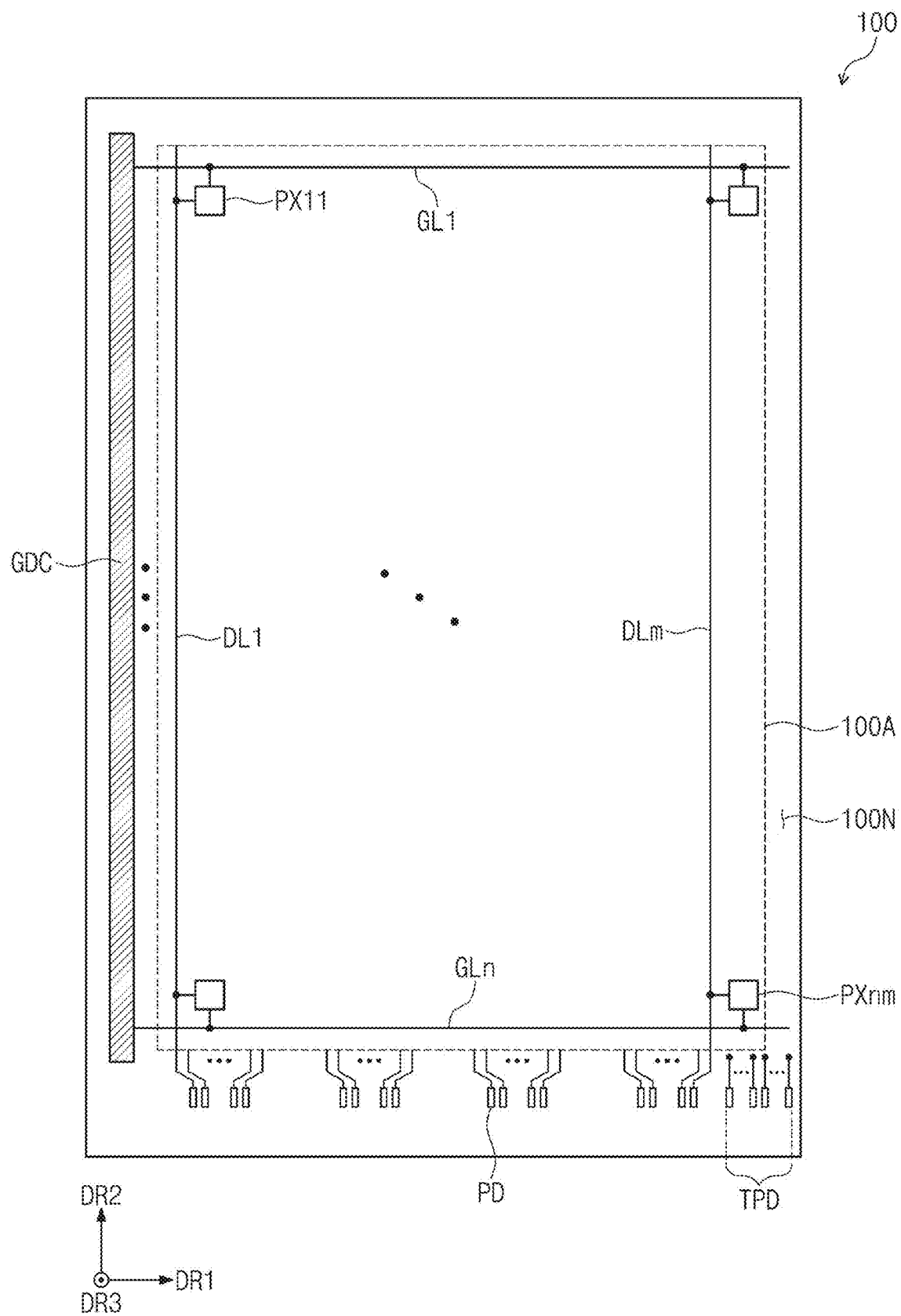
FIG. 3 is a plan view of a display layer according to one or more embodiments of the present disclosure.

FIG. 3 is a plan view of a display layer according to one or more embodiments of the present disclosure.

Referring to FIG. 3, a display layer 100 may include an active region 100A, and a peripheral region 100N adjacent to the active region 100A. The active region 100A and the peripheral region 100N may be distinguished according to whether a plurality of pixels PX11 to PXnm are located or not. The plurality of pixels PX11 to PXnm may be located in the active region 100A, and may be omitted from the peripheral region 100N.

When viewed on a plane, the active region 100A may overlap the active region AA (see FIG. 1) of the electronic device 1000 (see FIG. 1). The peripheral region 100N may overlap the peripheral region NA (see FIG. 1) of the electronic device 1000 (see FIG. 1).

The plurality of pixels PX11 to PXnm may be respectively connected to corresponding gate lines among a plurality of gate lines GL1 to GLn, and respectively connected to corresponding data lines among a plurality of data lines DL1 to DLm. The plurality of pixels PX11 to PXnm may each include a pixel-driving circuit and a display element.

The display layer 100 may include more various types of signal lines according to the configurations of the pixel-driving circuits of the plurality of pixels PX11 to PXnm.

A scan-driving circuit GDC and a plurality of pads PD may be located in the peripheral region 100N. The scan-driving circuit GDC may be formed through the same process as that of circuits inside the electronic device 1000. A data-driving circuit may be a partial circuit configured in a driving chip, and the driving chip may be electrically connected to the plurality of the pixels PX11 to PXnm through the pads PD located in the peripheral region 100N.

The display layer 100 may further include a plurality of sensing pads TPD. The plurality of sensing pads TPD may be located in the peripheral region 100N. The plurality of sensing pads TPD may be electrically connected to the plurality of sensing electrodes of the sensor layer 200 (see FIG. 2), respectively.

Figure 4:
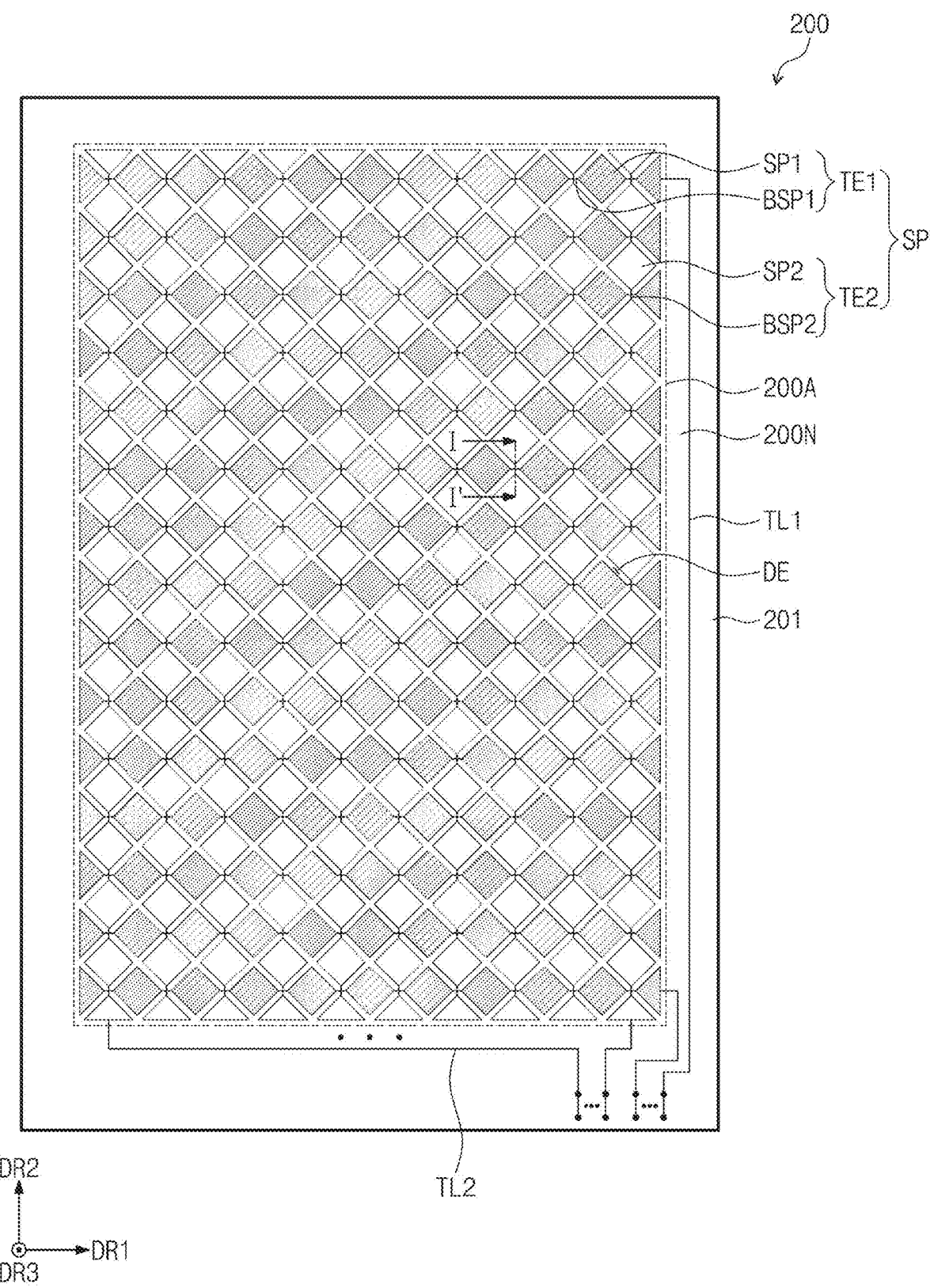
FIG. 4 is a plan view of a sensor layer according to one or more embodiments of the present disclosure.

FIG. 4 is a plan view of a sensor layer according to one or more embodiments of the present disclosure.

Referring to FIG. 4, a sensor layer 200 may include an active region 200A, and a peripheral region 200N adjacent to the active region 200A. The active region 200A may be a region activated in response to electrical signals. The active region 200A may be a region that detects an input. When viewed on a plane, the active region 200A may overlap the active region 100A (see FIG. 3) of the display layer 100 (see FIG. 3). The peripheral region 200N may overlap the peripheral region 100N (see FIG. 3) of the display layer 100 (see FIG. 3).

The sensor layer 200 may include a base layer 201, a plurality of sensing electrodes SP, a plurality of sensing lines TL1 and TL2, and a dummy electrode DE. The plurality of sensing electrodes SP and the dummy electrode DE may be located in the active region 200A. The plurality of sensing lines TL1 and TL2 may be located in the peripheral region 200N.

The base layer 201 may be an inorganic layer including any one among silicon nitride, silicon oxynitride, and silicon oxide. Alternatively, the base layer 201 may be an organic layer including an epoxy resin, an acrylate resin, or an imide-based resin. The base layer 201 may be directly formed on the display layer 100 (see FIG. 2).

The plurality of sensing electrodes SP may include a plurality of first sensing electrodes TE1 and a plurality of second sensing electrodes TE2. The sensor layer 200 may acquire information on an external input through changes in capacitance between the plurality of first sensing electrodes TE1 and the plurality of second sensing electrodes TE2.

The plurality of first sensing electrodes TE1 may each extend along a first direction DR1, and the plurality of first sensing electrodes TE1 may be arranged along a second direction DR2. The plurality of first sensing electrodes TE1 may each include a plurality of first sensing patterns SP1 and a plurality of first connection patterns BSP1. The plurality of first connection patterns BSP1 may each electrically connect two first sensing patterns SP1 adjacent to each other. The plurality of first sensing patterns SP1 and the plurality of first connection patterns BSP1 may have a mesh structure. The plurality of first sensing patterns SP1 may be referred to as a plurality of first sensing parts SP1. The plurality of first connection patterns BSP1 may be referred to as a plurality of first connection parts BSP1.

The plurality of second sensing electrodes TE2 may each extend along the second direction DR2, and the plurality of second sensing electrodes TE2 may be arranged along the first direction DR1. The plurality of second sensing electrodes TE2 may each include a plurality of second sensing patterns SP2 and a plurality of second connection patterns BSP2. The plurality of second connection patterns BSP2 may each electrically connect two second sensing patterns SP2 adjacent to each other. The plurality of second sensing patterns SP2 and the plurality of second connection patterns BSP2 may have a mesh structure. The plurality of second sensing patterns SP2 may be referred to as a plurality of second sensing parts SP2. The plurality of second connection patterns BSP2 may be referred to as a plurality of second connection parts BSP2.

The plurality of first connection patterns BSP1 may be located on a different layer from the plurality of second connection patterns BSP2. The plurality of second connection patterns BSP2 and the plurality of first sensing electrodes TE1 may cross each other while being insulated from each other. For example, the plurality of first connection patterns BSP1 and the plurality of second connection patterns BSP2 may respectively cross while being insulated from each other.

The dummy electrode DE may be located to be adjacent to the plurality of sensing electrodes SP. The dummy electrode DE may have a mesh structure.

The plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The plurality of first sensing lines TL1 and the plurality of second sensing lines TL2 may be electrically connected to the plurality of sensing pads TPD (see FIG. 3) through contact holes, respectively.

Figure 5:
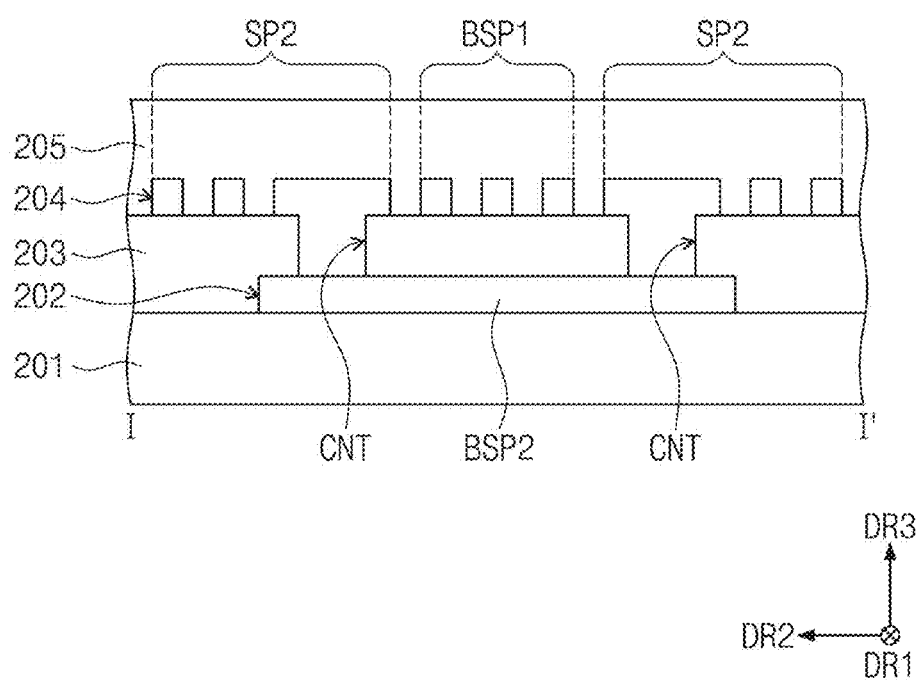
FIG. 5 is a cross-sectional view taken along the line I-I' of FIG. 4 according to one or more embodiments of the present disclosure.

FIG. 5 is a cross-sectional view taken along the line I-I' of FIG. 4 according to one or more embodiments of the present disclosure.

Referring to FIGS. 4 and 5, the sensor layer 200 may include a base layer 201, a first conductive layer 202, a sensing insulation layer 203, a second conductive layer 204, and a cover insulation layer 205.

The first conductive layer 202 may be located on the base layer 201. The first conductive layer 202 may include a plurality of second connection patterns BSP2. The plurality of second connection patterns BSP2 may have a mesh structure.

The sensing insulation layer 203 may be located on the first conductive layer 202. The sensing insulation layer 203 may have a single-layer or multi-layer structure. The sensing insulation layer 203 may include an inorganic material, an organic material, or a composite material.

The second conductive layer 204 may be located on the sensing insulation layer 203. The second conductive layer 204 may include a plurality of first sensing patterns SP1, a plurality of first connection patterns BSP1, and a plurality of second sensing patterns SP2. The plurality of first sensing patterns SP1, the plurality of second sensing patterns SP2, and the plurality of first connection patterns BSP1 may have a mesh structure.

The first conductive layer 202 and the second conductive layer 204 may each have a single-layer structure, or may have a structure of multiple layers stacked along a third direction DR3.

A plurality of contact holes CNT may be formed by passing through the sensing insulation layer 203 in the third direction DR3. Two of the second sensing patterns SP2, which are adjacent to each other, may be electrically connected to the second connection pattern BSP2 through the plurality of contact holes CNT.

The cover insulation layer 205 may be located on the plurality of first sensing patterns SP1, the plurality of first connection patterns BSP1, and the plurality of second sensing patterns SP2. The cover insulation layer 205 may have a single-layer or multi-layer structure. The cover insulation layer 205 may include an inorganic material, an organic material, or a composite material.

FIG. 5 illustrates a bottom bridge structure in which the plurality of second connection patterns BSP2 are located under the plurality of first sensing patterns SP1, the plurality of first connection patterns BSP1, and the plurality of second sensing patterns SP2, but one or more embodiments of the present disclosure is not limited thereto. For example, the sensor layer 200 may have a top bridge structure in which the plurality of second connection patterns BSP2 are located above the plurality of first sensing patterns SP1, the plurality of first connection patterns BSP1, and the plurality of second sensing patterns SP2.

Figure 6:
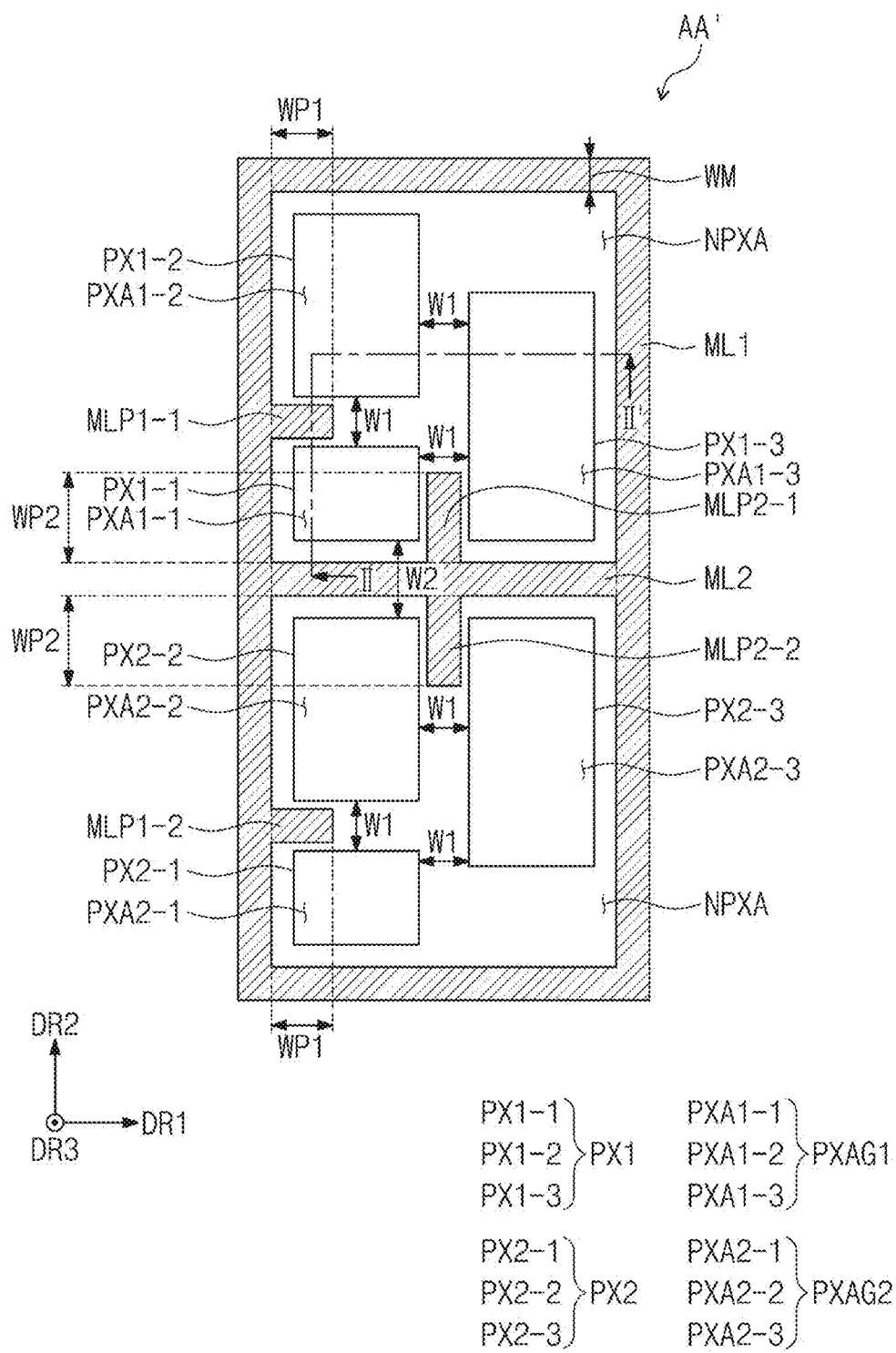
FIG. 6 is a plan view illustrating region AA' of FIG. 1 according to one or more embodiments of the present disclosure.

FIG. 6 is a plan view illustrating region AA' of FIG. 1 according to one or more embodiments of the present disclosure.

Referring to FIGS. 1 and 6, a first pixel group region PXAG1, a second pixel group region PXAG2, and a light-blocking region NPXA may be defined on the display layer 100 (see FIG. 3) of the electronic device 1000.

A plurality of pixels PX may include a first pixel group PX1 and a second pixel group PX2.

The first pixel group PX1 may include a (1-1)-th sub pixel PX1-1, a (1-2)-th sub pixel PX1-2, and a (1-3)-th sub pixel PX1-3. The (1-1)-th sub pixel PX1-1 may emit first light. The (1-2)-th sub pixel PX1-2 may emit second light. The (1-3)-th sub pixel PX1-3 may emit third light.

The first pixel group region PXAG1 may include a (1-1)-th sub pixel region PXA1-1, a (1-2)-th sub pixel region PXA1-2, and a (1-3)-th sub pixel region PXA1-3.

The (1-1)-th sub pixel region PXA1-1 may be a region corresponding to the (1-1)-th sub pixel PX1-1, the (1-2)-th sub pixel region PXA1-2 may be a region corresponding to the (1-2)-th sub pixel PX1-2, and the (1-3)-th sub pixel region PXA1-3 may be a region corresponding to the (1-3)-th sub pixel PX1-3.

That is, the (1-1)-th sub pixel region PXA1-1 may correspond to the area of the (1-1)-th sub pixel PX1-1, the (1-2)-th sub pixel region PXA1-2 may correspond to the area of the (1-2)-th sub pixel PX1-2, and the (1-3)-th sub pixel region PXA1-3 may correspond to the area of the (1-3)-th sub pixel PX1-3.

The display layer 100 (see FIG. 3) may provide the first light through a plurality of (1-1)-th sub pixel regions PXA1-1, may provide the second light through a plurality of (1-2)-th sub pixel regions PXA1-2, and may provide the third light through a plurality of (1-3)-th sub pixel regions PXA1-3.

The first light, the second light, and the third light may respectively correspond to different colors. For example, the first color light may be red color light, the second color light may be green color light, and the third color light may be blue color light.

The (1-2)-th sub pixel PX1-2 may be spaced apart from the (1-1)-th sub pixel PX1-1 at a first distance W1 in a second direction DR2. For example, the first distance W1 may be about 12.2 µm.

The (1-3)-th sub pixel PX1-3 may be spaced apart from each of the (1-1)-th sub pixel PX1-1 and the (1-2)-th sub pixel PX1-2 at the first distance W1 in a first direction DR1.

The area of the (1-1)-th sub pixel PX1-1 may be less than the area of the (1-2)-th sub pixel PX1-2. The area of the (1-2)-th sub pixel PX1-2 may be less than the area of the (1-3)-th sub pixel PX1-3. For example, the area of the (1-1)-th sub pixel PX1-1 may be about 970 $\mu m^2$, the area of the (1-2)-th sub pixel PX1-2 may be about 1087 $\mu m^2$, and the area of the (1-3)-th sub pixel PX1-3 may be about 1678 $\mu m^2$.

According to one or more embodiments of the present disclosure, because mesh lines ML1 and ML2 are not located in a partial region between the (1-1)-th sub pixel PX1-1, the (1-2)-th sub pixel PX1-2, and the (1-3)-th sub pixel PX1-3, the area of each of the (1-1)-th sub pixel PX1-1, the (1-2)-th sub pixel PX1-2, and the (1-3)-th sub pixel PX1-3 may increase. Accordingly, the first distance W1 may be reduced. Because the aperture ratio of each of the (1-1)-th sub pixel region PXA1-1, the (1-2)-th sub pixel region PXA1-2, and the (1-3)-th sub pixel region PXA1-3 is improved, current density applied to the plurality of pixels PX may be reduced, so that the life span of each of the plurality of pixels PX may increase. Therefore, it may be possible to provide the electronic device 1000 having improved reliability.

The second pixel group PX2 may include a (2-1)-th sub pixel PX2-1, a (2-2)-th sub pixel PX2-2, and a (2-3)-th sub pixel PX2-3. The (2-1)-th sub pixel PX2-1 may emit the first light, the (2-2)-th sub pixel PX2-2 may emit the second light, and the (2-3)-th sub pixel PX2-3 may emit the third light.

The second pixel group region PXAG2 may include a (2-1)-th sub pixel region PXA2-1, a (2-2)-th sub pixel region PXA2-2, and a (2-3)-th sub pixel region PXA2-3.

The (2-1)-th sub pixel region PXA2-1 may be a region corresponding to the (2-1)-th sub pixel PX2-1, the (2-2)-th sub pixel region PXA2-2 may be a region corresponding to the (2-2)-th sub pixel PX2-2, and the (2-3)-th sub pixel region PXA2-3 may be a region corresponding to the (2-3)-th sub pixel PX2-3.

That is, the (2-1)-th sub pixel region PXA2-1 may correspond to the area of the (2-1)-th sub pixel PX2-1, the (2-2)-th sub pixel region PXA2-2 may correspond to the area of the (2-2)-th sub pixel PX2-2, and the (2-3)-th sub pixel region PXA2-3 may correspond to the area of the (2-3)-th sub pixel PX2-3.

The display layer 100 (see FIG. 3) may provide the first light through a plurality of (2-1)-th sub pixel regions PXA2-1, may provide the second light through a plurality of (2-2)-th sub pixel regions PXA2-2, and may provide the third light through a plurality of (2-3)-th sub pixel regions PXA2-3.

The (2-2)-th sub pixel region PXA2-2 may be located adjacent to the (1-1)-th sub pixel region PXA1-1 at a second distance W2 in the second direction DR2. The second distance W2 may be larger than the first distance W1. For example, the second distance W2 may be about 19 µm.

That is, according to one or more embodiments of the present disclosure, the distance between the sub pixels included in each of the first pixel group PX1 and the second pixel group PX2 may be less than the distance between the first pixel group PX1 and the second pixel group PX2. Accordingly, the area of each of the sub pixels included in each of the first pixel group PX1 and the second pixel group PX2 may increase, and the aperture ratio of each of the sub pixels may be improved, so that current density applied to the plurality of pixels PX may be reduced, and thus the life span of each of the plurality of pixels PX may increase. Therefore, it may be possible to provide the electronic device 1000 having improved reliability.

The (2-1)-th sub pixel PX2-1 may be spaced apart from the (2-2)-th sub pixel PX2-2 at the first distance W1 in the second direction DR2.

The (2-3)-th sub pixel PX2-3 may be spaced apart from each of the (2-1)-th sub pixel PX2-1 and the (2-2)-th sub pixel PX2-2 at the first distance W1 in the first direction DR1.

The area of the (2-1)-th sub pixel PX2-1 may be less than the area of the (2-2)-th sub pixel PX2-2. The area of the (2-2)-th sub pixel PX2-2 may be less than the area of the (2-3)-th sub pixel PX2-3. For example, the area of the (2-1)-th sub pixel PX2-1 may be about 970 $\mu m^2$, the area of the (2-2)-th sub pixel PX2-2 may be about 1087 $\mu m^2$, and the area of the (2-3)-th sub pixel PX2-3 may be about 1678 $\mu m^2$.

According to one or more embodiments of the present disclosure, because the mesh lines ML1 and ML2 are not located in a partial region between the (2-1)-th sub pixel PX2-1, the (2-2)-th sub pixel PX2-2, and the (2-3)-th sub pixel PX2-3, the area of each of the (2-1)-th sub pixel PX2-1, the (2-2)-th sub pixel PX2-2, and the (2-3)-th sub pixel PX2-3 may increase. Accordingly, the first distance W1 may be reduced. Because the aperture ratio of each of the (2-1)-th sub pixel region PXA2-1, the (2-2)-th sub pixel region PXA2-2, and the (2-3)-th sub pixel region PXA2-3 is improved, current density applied to the plurality of pixels PX may be reduced, so that the life span of each of the plurality of pixels PX may increase. Therefore, it may be possible to provide the electronic device 1000 having improved reliability.

The light-blocking region NPXA may be a region located adjacent to the (1-1)-th sub pixel region PXA1-1, the (1-2)-th sub pixel region PXA1-2, the (1-3)-th sub pixel region PXA1-3, the (2-1)-th sub pixel region PXA2-1, the (2-2)-th sub pixel region PXA2-2, and the (2-3)-th sub pixel region PXA2-3. The light-blocking region NPXA may set boundaries of the (1-1)-th sub pixel region PXA1-1, the (1-2)-th sub pixel region PXA1-2, the (1-3)-th sub pixel region PXA1-3, the (2-1)-th sub pixel region PXA2-1, the (2-2)-th sub pixel region PXA2-2, and the (2-3)-th sub pixel region PXA2-3. The light-blocking region NPXA may reduce or prevent color mixing of the (1-1)-th sub pixel region PXA1-1, the (1-2)-th sub pixel region PXA1-2, the (1-3)-th sub pixel region PXA1-3, the (2-1)-th sub pixel region PXA2-1, the (2-2)-th sub pixel region PXA2-2, and the (2-3)-th sub pixel region PXA2-3.

The sensor layer 200 (see FIG. 4) of the electronic device 1000 may include the sensing electrode SP (see FIG. 4). The sensing electrode SP (see FIG. 4) may include a first mesh line ML1 and a second mesh line ML2. For example, the first mesh line ML1 and the second mesh line ML2 may be provided in the second conductive layer 204 (see FIG. 5). However, this is illustrated only as an example, and the first mesh line ML1 and the second mesh line ML2, according to one or more embodiments of the present disclosure, may be provided in the first conductive layer 202 (see FIG. 5).

When viewed on a plane, the first mesh line ML1 may be located by surrounding the first pixel group region PXAG1 and the second pixel group region PXAG2.

The second mesh line ML2 may be electrically connected to the first mesh line ML1, and may extend in the first direction DR1. At this time, the second mesh line ML2 may be located between the first pixel group region PXAG1 and the second pixel group region PXAG2.

When viewed on a plane, the first mesh line ML1 and the second mesh line ML2 may not overlap the first pixel group region PXAG1 and the second pixel group region PXAG2. The first mesh line ML1 and the second mesh line ML2 may have the same electrode width WM. The electrode width WM may be less than the first distance W1. For example, the electrode width may be about 3 μm.

The first mesh line ML1 may include a (1-1)-th protruding part MLP1-1 and a (1-2)-th protruding part MLP1-2.

The (1-1)-th protruding part MLP1-1 may be electrically connected to the first mesh line ML1, and may protrude at a first protruding distance WP1 in the first direction DR1. When viewed on a plane, the (1-1)-th protruding part MLP1-1 may be located between the (1-1)-th sub pixel PX1-1 and the (1-2)-th sub pixel PX1-2. The first protruding distance WP1 may be less than the width of each of the (1-1)-th sub pixel PX1-1 and the (1-2)-th sub pixel PX1-2 in the first direction DR1.

The (1-2)-th protruding part MLP1-2 may be electrically connected to the first mesh line ML1, and may protrude at the first protruding distance WP1 in the first direction DR1. When viewed on a plane, the (1-2)-th protruding part MLP1-2 may be located between the (2-1)-th sub pixel PX2-1 and the (2-2)-th sub pixel PX2-2. The first protruding distance WP1 may be less than the width of each of the (2-1)-th sub pixel PX2-1 and the (2-2)-th sub pixel PX2-2 in the first direction DR1.

The second mesh line ML2 may include a (2-1)-th protruding part MLP2-1 and a (2-2)-th protruding part MLP2-2.

The (2-1)-th protruding part MLP2-1 may be electrically connected to the second mesh line ML2, and may protrude at a second protruding distance WP2 in the second direction DR2. When viewed on a plane, the (2-1)-th protruding part MLP2-1 may be located between the (1-1)-th sub pixel PX1-1 and the (1-3)-th sub pixel PX1-3. The second protruding distance WP2 may be less than the width of each of the (1-1)-th sub pixel PX1-1 and the (1-3)-th sub pixel PX1-3 in the second direction DR2.

The (2-2)-th protruding part MLP2-2 may be electrically connected to the second mesh line ML2, and may protrude at the second protruding distance WP2 in the opposite direction of the second direction DR2. When viewed on a plane, the (2-2)-th protruding part MLP2-2 may be located between the (2-2)-th sub pixel PX2-2 and the (2-3)-th sub pixel PX2-3. The second protruding distance WP2 may be less than the width of each of the (2-2)-th sub pixel PX2-2 and the (2-3)-th sub pixel PX2-3 in the second direction DR2.

The first protruding distance WP1 and the second protruding distance WP2 may have different sizes, but one or more embodiments of the present disclosure is not limited thereto. The first protruding distance WP1 and the second protruding distance WP2 may have the same size.

Unlike one or more embodiments of the present disclosure, if the mesh lines are located in all regions between the (1-1)-th sub pixel PX1-1, the (1-2)-th sub pixel PX1-2, the (1-3)-th sub pixel PX1-3, the (2-1)-th sub pixel PX2-1, the (2-2)-th sub pixel PX2-2, and the (2-3)-th sub pixel PX2-3, light emitted from each of the plurality of pixels PX may be blocked by the mesh line, due to the mesh lines located on a light-emitting element, so that a first angle AG (see FIG. 7) of the light emitted from each of the plurality of pixels PX may be reduced.

However, according to one or more embodiments of the present disclosure, the plurality of pixels PX may emit light through the pixel group region PXAG1 or PXAG2. When viewed on a plane, the sensing electrode SP (see FIG. 4) may not be located in a partial region between the (1-2)-th sub pixel PX1-2 and the (1-3)-th sub pixel PX1-3, or in a partial region between the (2-1)-th sub pixel PX2-1 and the (2-3)-th sub pixel PX2-3. Accordingly, an effect of a phenomenon in which the light emitted from each of the plurality of pixels PX is blocked by the mesh line, due to the mesh lines located on the light-emitting element, may be reduced or prevented. Therefore, the first angle AG (see FIG. 7) of the light emitted from each of the pixels PX may not be limited by the mesh line. The area of each of the (2-1)-th sub pixel PX2-1, the (2-2)-th sub pixel PX2-2, and the (2-3)-th sub pixel PX2-3 may increase. Because the aperture ratio of each of the (2-1)-th sub pixel region PXA2-1, the (2-2)-th sub pixel region PXA2-2, and the (2-3)-th sub pixel region PXA2-3 is improved, current density applied to the plurality of pixels PX may be reduced, so that the life span of each of the plurality of pixels PX may increase. Therefore, it may be possible to provide the electronic device 1000 having improved reliability.

Figure 7:
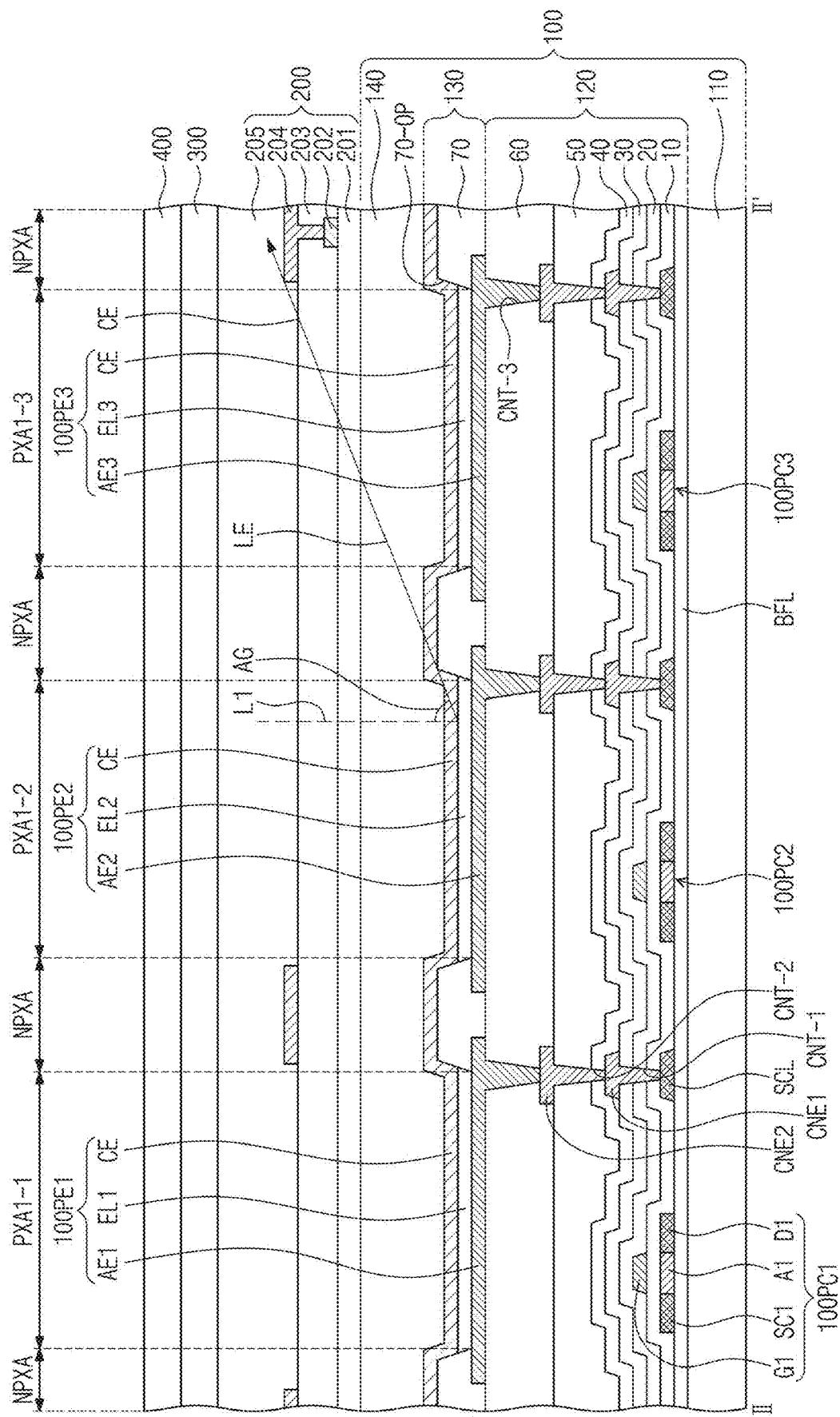
FIG. 7 is a cross-sectional view of an electronic device taken along the line II-II' of FIG. 6 according to one or more embodiments of the present disclosure.

FIG. 7 is a cross-sectional view of an electronic device taken along the line II-II' of FIG. 6 according to one or more embodiments of the present disclosure. For the description with reference to FIG. 7, the components described with reference to FIG. 2 will be denoted as the same reference numerals or symbols, and the descriptions thereof will be omitted.

Referring to FIGS. 6 and 7, the electronic device 1000 (see FIG. 1) may include a display layer 100, a sensor layer 200, an anti-reflection panel 300, and a window 400.

The display layer 100 may include a base layer 110, a circuit layer 120, a light-emitting element layer 130, and an encapsulation layer 140.

At least one inorganic layer is formed on an upper surface of the base layer 110. The inorganic layer may include at least one of aluminum oxide, titanium oxide, silicon oxide, silicon nitride, silicon oxynitride, zirconium oxide, or hafnium oxide. The inorganic layer may be formed in multiple layers. The multiple inorganic layers may include a barrier layer and/or a buffer layer. It is illustrated that the display layer 100 includes the buffer layer BFL.

The buffer layer BFL may improve bonding forces between the base layer 110 and a semiconductor pattern. The buffer layer BFL may include at least one of silicon oxide, silicon nitride, or silicon oxynitride. For example, the buffer layer BFL may include a structure of a silicon oxide layer and a silicon nitride layer alternately stacked.

The semiconductor pattern may be located on the buffer layer BFL. The semiconductor pattern may include polysilicon. However, one or more embodiments of the present disclosure is not limited thereto, and the semiconductor pattern may include amorphous silicon, low-temperature polycrystalline silicon, or an oxide semiconductor.

FIG. 7 only illustrates a part of the semiconductor pattern, and the semiconductor pattern may be further located in another region. The semiconductor pattern may be arranged in a certain rule across pixels. The semiconductor pattern may vary in electrical property according to whether it is doped or not. The semiconductor pattern may include a first region having high conductivity and a second region having low conductivity. The first region may be doped with an N-type dopant or a P-type dopant. A P-type transistor may include a doped region doped with a P-type dopant, and an N-type transistor may include a doped region doped with an N-type dopant. The second region may be an undoped region, or may be a doped region that is doped with lower concentration than the first region.

The first region may have higher conductivity than the conductivity of the second region, and may substantially serve as an electrode or a signal line. The second region may substantially correspond to an active region of the transistor. In other words, a portion of the semiconductor pattern may be the active region of the transistor, another portion may be a source region or a drain region of the transistor, and another region may be a connection electrode or connection signal line.

A plurality of pixels may include a plurality of first pixels, a plurality of second pixels, and a plurality of third pixels. The plurality of pixels may each have an equivalent circuit including seven transistors, one capacitor, and a light-emitting element, and an equivalent circuit diagram of the pixel may be changed in various forms. FIG. 7 illustrates one transistor and a light-emitting element included in each of the pixels.

A (1-1)-th sub pixel PX1-1 may include a first transistor 100PC1 and a first light-emitting element 100PE1.

A (1-2)-th sub pixel PX1-2 may include a second transistor 100PC2 and a second light-emitting element 100PE2.

A (1-3)-th sub pixel PX1-3 may include a third transistor 100PC3 and a third light-emitting element 100PE3.

A source region SC1, an active region A1, and a drain region D1 of each of the first transistor 100PC1, the second transistor 100PC2, and the third transistor 100PC3 may be formed from the semiconductor pattern. The source region SC1 and the drain region D1 may respectively extend in opposite directions from the active region A1 on a cross-section. FIG. 7 illustrates a portion of a connection signal line SCL formed from the semiconductor pattern. In one or more embodiments, the connection signal line SCL may be connected to the drain region D1 of the first transistor 100PC1 on a plane.

A first insulation layer 10 may be located on the buffer layer BFL. The first insulation layer 10 may overlap the plurality of pixels in common, and may cover the semiconductor pattern. The first insulation layer 10 may be an inorganic layer and/or an organic layer, and may have a single-layer or multi-layer structure. The first insulation layer 10 may include at least one of aluminum oxide, titanium oxide, silicon oxide, silicon nitride, silicon oxynitride, zirconium oxide, or hafnium oxide. The first insulation layer 10 may be a single-layer silicon oxide layer. An insulation layer of the circuit layer 120 to be described later, as well as the first insulation layer 10, may be an inorganic layer and/or an organic layer, and may have a single-layer or multi-layer structure. The inorganic layer may include at least one of the above-mentioned materials, but one or more embodiments of the present disclosure is not limited thereto.

A gate G1 of each of the first transistor 100PC1, the second transistor 100PC2, and the third transistor 100PC3 is located on the first insulation layer 10. The gate G1 may be a portion of a metal pattern. The gate G1 overlaps the active region A1. The gate G1 may function as a mask in a doping process of the semiconductor pattern.

A second insulation layer 20 may be located on the first insulation layer 10, and may cover the gate G1. The second insulation layer 20 may overlap the pixels in common. The second insulation layer 20 may be an inorganic layer and/or an organic layer, and may have a single-layer or multi-layer structure. The second insulation layer 20 may include at least one of silicon oxide, silicon nitride, or silicon oxynitride. The second insulation layer 20 may have a multi-layer structure including a silicon oxide layer and a silicon nitride layer.

A third insulation layer 30 may be located on the second insulation layer 20. The third insulation layer 30 may have a single-layer or multi-layer structure. For example, the third insulation layer 30 may have a multi-layer structure including a silicon oxide layer and a silicon nitride layer.

A first connection electrode CNE1 may be located on the third insulation layer 30. The first connection electrode CNE1 may be connected to the connection signal line SCL through a contact hole CNT-1 passing through the first, second, and third insulation layers 10, 20, and 30.

A fourth insulation layer 40 may be located on the third insulation layer 30. The fourth insulation layer 40 may be a single-layer silicon oxide layer. A fifth insulation layer 50 may be located on the fourth insulation layer 40. The fifth insulation layer 50 may be an organic layer.

A second connection electrode CNE2 may be located on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 may be located on the fifth insulation layer 50, and may cover the second connection electrode CNE2. The sixth insulation layer 60 may be an organic layer.

The light-emitting element layer 130 may be located on the circuit layer 120. The light-emitting element layer 130 may include a plurality of light-emitting elements 100PE1, 100PE2, and 100PE3. For example, the light-emitting element layer 130 may include an organic light-emitting material, quantum dots, quantum rods, a micro LED, or a nano LED. Hereinafter, the plurality of light-emitting elements 100PE1, 100PE2, and 100PE3 are illustrated as the organic light-emitting elements, but one or more embodiments of the present disclosure is not particularly thereto.

The first light-emitting element 100PE1 may include a first pixel electrode AE1, a first light-emitting layer EL1, and a common electrode CE.

The second light-emitting element 100PE2 may include a second pixel electrode AE2, a second light-emitting layer EL2, and the common electrode CE.

The third light-emitting element 100PE3 may include a third pixel electrode AE3, a third light-emitting layer EL3, and the common electrode CE.

The first pixel electrode AE1, the second pixel electrode AE2, and the third pixel electrode AE3 may be located on the sixth insulation layer 60. The first pixel electrode AE1, the second pixel electrode AE2, and the third pixel electrode AE3 may each be connected to the second connection electrode CNE2 through a contact hole CNT-3 passing through the sixth insulation layer 60.

A pixel-defining film 70 may be located on the sixth insulation layer 60, and may cover a portion of the first pixel electrode AE1. An opening 70-OP is defined in the pixel-defining film 70. The opening 70-OP of the pixel-defining film 70 exposes at least a portion of each of the first pixel electrode AE1, the second pixel electrode AE2, and the third pixel electrode AE3.

The active region 100A (see FIG. 3) may include a light-blocking region NPXA adjacent to a (1-1)-th sub pixel region PXA1-1, a (1-2)-th sub pixel region PXA1-2, and a (1-3)-th sub pixel region PXA1-3. The light-blocking region NPXA may surround the (1-1)-th sub pixel region PXA1-1, the (1-2)-th sub pixel region PXA1-2, and the (1-3)-th sub pixel region PXA1-3.

The (1-1)-th sub-pixel region PXA1-1, the (1-2)-th sub pixel region PXA1-2, and the (1-3)-th sub pixel region PXA1-3 are defined respectively corresponding to partial regions of the first pixel electrode AE1, the second pixel electrode AE2, and the third pixel electrode AE3 exposed by the opening 70-OP.

The first light-emitting layer EL1 may be located on the first pixel electrode AE1. The second light-emitting layer EL2 may be located on the second pixel electrode AE2. The third light-emitting layer EL3 may be located on the third pixel electrode AE3. The first light-emitting layer EL1, the second light-emitting layer EL2, and the third light-emitting layer EL3 may each be located in a region corresponding to the opening 70-OP.

When light emitted from the light-emitting layer EL1, EL2, or EL3 passes through the encapsulation layer 140, the light may be emitted at an angle (e.g., predetermined angle) due to a second conductive layer 204. The light emitted from the light-emitting layer EL1, EL2, or EL3 may be referred to as first light LE. The angle (e.g., predetermined angle) may refer to an angle formed by a line L1, which is parallel to a third direction DR3, and the first light LE. The angle may be referred to as a first angle AG.

The common electrode CE may be located on the light-emitting layer EL1, EL2, and EL3. The common electrode CE may have an integral shape, and may be located on the plurality of pixels in common.

In one or more embodiments, a hole control layer may be located between the first pixel electrode AE1 and the first light-emitting layer EL1. The hole control layer may be located in the (1-1)-th sub pixel region PXA1-1 and the light-blocking region NPXA in common. The hole control layer may include a hole transport layer, and may further include a hole injection layer. An electron control layer may be located between the first light-emitting layer EL1 and the common electrode CE. The electron control layer may include an electron transport layer, and may further include an electron injection layer. The hole control layer and the electron control layer may be formed across the plurality of pixels in common using an open mask.

The encapsulation layer 140 may be located on the light-emitting element layer 130. The encapsulation layer 140 may include only an inorganic layer, but the layers constituting the encapsulation layer 140 are not limited thereto. The encapsulation layer 140 may have a thickness of about 10 μm to about 12 μm. For example, the thickness of the encapsulation layer 140 may be about 10.5 μm. Unlike one or more embodiments of the present disclosure, when the thickness of the encapsulation layer 140 is less than about 10 μm, the encapsulation layer 140 may not suitably perform its function, and when the thickness of the encapsulation layer 140 is greater than about 12 μm, the first light LE may be blocked by the second conductive layer 204, to be described later, so that the first angle AG may be reduced. Accordingly, there may be a limitation in increasing the area of the sub pixel.

The inorganic layer may protect the light-emitting element layer 130 from moisture and oxygen. The inorganic layer may include a silicon nitride layer, a silicon oxynitride layer, a silicon oxide layer, a titanium oxide layer, an aluminum oxide layer, or the like.

The sensor layer 200 may include a base layer 201, a first conductive layer 202, a sensing insulation layer 203, a second conductive layer 204, and a cover insulation layer 205.

The base layer 201 may be an inorganic layer including at least one of silicon nitride, silicon oxynitride, or silicon oxide. Alternatively, the base layer 201 may be an organic layer including an epoxy resin, an acrylate resin, or an imide-based resin. The base layer 201 may have a single-layer structure, or may have a structure of multiple layers stacked along the third direction DR3.

The first conductive layer 202 and the second conductive layer 204 may each have a single-layer structure, or may have a stacked structure of multiple layers. The first conductive layer 202 may include a plurality of second connection patterns BSP2. The second conductive layer 204 may include a plurality of first sensing patterns SP1, a plurality of first connection patterns BSP1, and a plurality of second sensing patterns SP2. However, this is illustrated only as an example, and the components included in each of the first conductive layer 202 and the second conductive layer 204, according to one or more embodiments of the present disclosure, are not limited thereto.

The single-layer conductive layer may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include a conductive polymer such as PEDOT, a metal nano-wire, graphene, etc.

The multi-layer conductive layer may include metal layers. The metal layers may have a three-layer structure, for example, of titanium/aluminum/titanium. The multi-layer conductive layer may include at least one metal layer and at least one transparent conductive layer.

At least one of the sensing insulation layer 203 or the cover insulation layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulation layer 203 or the cover insulation layer 205 may include an organic film. The organic film may include at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

The anti-reflection panel 300 may be located on the sensor layer 200. The anti-reflection panel 300 reduces the reflectance for external light incident from above the window 400. According to one or more embodiments of the present disclosure, the anti-reflection panel 300 may be omitted.

The window 400 may be located on the anti-reflection panel 300. The window 400 may include an optically transparent insulating material. For example, the window 400 may include glass or plastic. The window 400 may have a multi-layer or single-layer structure. For example, the window 400 may include a plurality of plastic films bonded to each other by an adhesive, or include a glass substrate and a plastic film bonded to each other by an adhesive.

Unlike one or more embodiments of the present disclosure, when the second conductive layer 204 is located in all regions between the (1-2)-th sub pixel region PXA1-2 and the (1-3)-th sub pixel region PXA1-3, the first light LE may be blocked by the second conductive layer 204, so that the above-described first angle AG may be reduced. However, according to one or more embodiments of the present disclosure, because the second conductive layer 204 is not located between the (1-2)-th sub pixel region PXA1-2 and the (1-3)-th sub pixel region PXA1-3, it may be possible to reduce or prevent the likelihood of the first light LE being blocked by the second conductive layer 204. The first angle AG of the light emitted from each of the plurality of pixels PX may increase. The area of each of a (2-1)-th sub pixel PX2-1, a (2-2)-th sub pixel PX2-2, and a (2-3)-th sub pixel PX2-3 may increase. Accordingly, because the aperture ratio of each of the (2-1)-th sub pixel region PXA2-1, the (2-2)-th sub pixel region PXA2-2, and the (2-3)-th sub pixel region PXA2-3 is improved, current density applied to the plurality of pixels PX may be reduced, so that the life span of each of the plurality of pixels PX may increase. Therefore, it may be possible to provide the electronic device 1000 having improved reliability.

Figure 8:
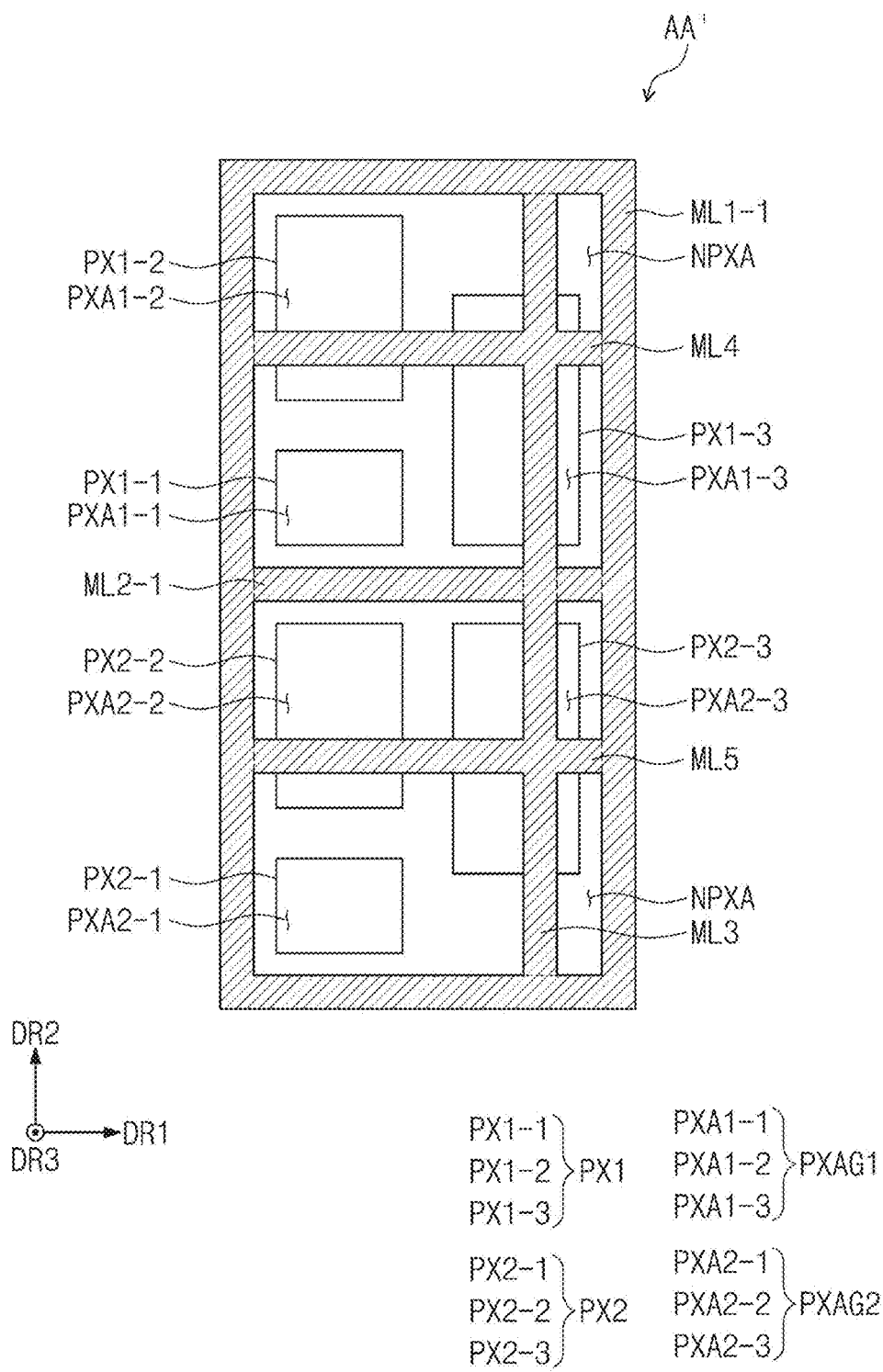
FIG. 8 is a plan view illustrating region AA' of FIG. 1 according to one or more embodiments of the present disclosure.

FIG. 8 is a plan view illustrating a region corresponding to region AA' of FIG. 1 according to one or more embodiments of the present disclosure. For the description with reference to FIG. 8, the components described with reference to FIG. 6 will be denoted as the same reference numerals or symbols, and the descriptions thereof will be omitted.

In the sensor layer 200 (see FIG. 4) of the electronic device 1000, the sensing electrode SP (see FIG. 4) may be defined. The sensing electrode SP (see FIG. 4) may include a (1-1)-th mesh line ML1-1, a (2-1)-th mesh line ML2-1, a third mesh line ML3, a fourth mesh line ML4, and a fifth mesh line ML5.

For example, the (1-1)-th mesh line ML1-1, the (2-1)-th mesh line ML2-1, the third mesh line ML3, the fourth mesh line ML4, and the fifth mesh line ML5 may be included in the second conductive layer 204 (see FIG. 5). However, this is illustrated only as an example, and the (1-1)-th mesh line ML1-1, the (2-1)-th mesh line ML2-1, the third mesh line ML3, the fourth mesh line ML4, and the fifth mesh line ML5, according to one or more embodiments of the present disclosure, may be included in the first conductive layer 202 (see FIG. 5).

When viewed on a plane, the (1-1)-th mesh line ML1-1 may be located by surrounding a first pixel group region PXAG1 and a second pixel group region PXAG2. The (1-1)-th mesh line ML1-1 may have a rectangular shape.

The (2-1)-th mesh line ML2-1 may be electrically connected to the (1-1)-th mesh line ML1-1, and may extend in a first direction DR1. At this time, the (2-1)-th mesh line ML2-1 may be located between the first pixel group region PXAG1 and the second pixel group region PXAG2.

The third mesh line ML3 may extend from the (1-1)-th mesh line ML1-1 in a second direction DR2, and may be electrically connected thereto. When viewed on a plane, the third mesh line ML3 may overlap at least a portion of a first pixel group PX1 and a second pixel group PX2.

FIG. 8 illustrates that the third mesh line ML3, on a plane, overlaps a (1-3)-th sub pixel PX1-3 and a (2-3)-th sub pixel PX2-3, but one or more embodiments of the present disclosure is not limited thereto. For example, the third mesh line ML3, on a plane, may overlap a (1-1)-th sub pixel PX1-1, a (1-2)-th sub pixel PX1-2, a (2-1)-th sub pixel PX2-1, and a (2-2)-th sub pixel PX2-2.

The fourth mesh line ML4 may extend from the (1-1)-th mesh line ML1-1 in the first direction DR1, and may be electrically connected thereto. When viewed on a plane, the fourth mesh line ML4 may overlap at least a portion of the first pixel group PX1.

FIG. 8 illustrates that the fourth mesh line ML4, on a plane, overlaps the (1-2)-th sub pixel PX1-2 and the (1-3)-th sub pixel PX1-3, but one or more embodiments of the present disclosure is not limited thereto. For example, the fourth mesh line ML4, on a plane, may overlap the (1-1)-th sub pixel PX1-1 and the (1-3)-th sub pixel PX1-3.

The fifth mesh line ML5 may extend from the (1-1)-th mesh line ML1-1 in the first direction DR1, and may be electrically connected thereto. When viewed on a plane, the fifth mesh line ML5 may overlap at least a portion of the second pixel group PX2.

FIG. 8 illustrates that the fifth mesh line ML5, on a plane, overlaps the (2-2)-th sub pixel PX2-2 and the (2-3)-th sub pixel PX2-3, but one or more embodiments of the present disclosure is not limited thereto. For example, the fifth mesh line ML5, on a plane, may overlap the (2-1)-th sub pixel PX2-1 and the (2-3)-th sub pixel PX2-3.

According to one or more embodiments of the present disclosure, on a plane, due to the third mesh line ML3, the fourth mesh line ML4, and the fifth mesh line ML5 located overlapping the first pixel group PX1 and the second pixel group PX2, the mutual capacitance may increase between the plurality of first sensing electrodes TE1 (see FIG. 4) and the plurality of second sensing electrodes TE2 (see FIG. 4) each formed by the third mesh line ML3, the fourth mesh line ML4, and the fifth mesh line ML5. As the mutual capacitance increases, the amount of change in mutual capacitance may increase. Therefore, the sensing sensitivity of the sensor layer 200 (see FIG. 4) may be improved.

Figure 9:
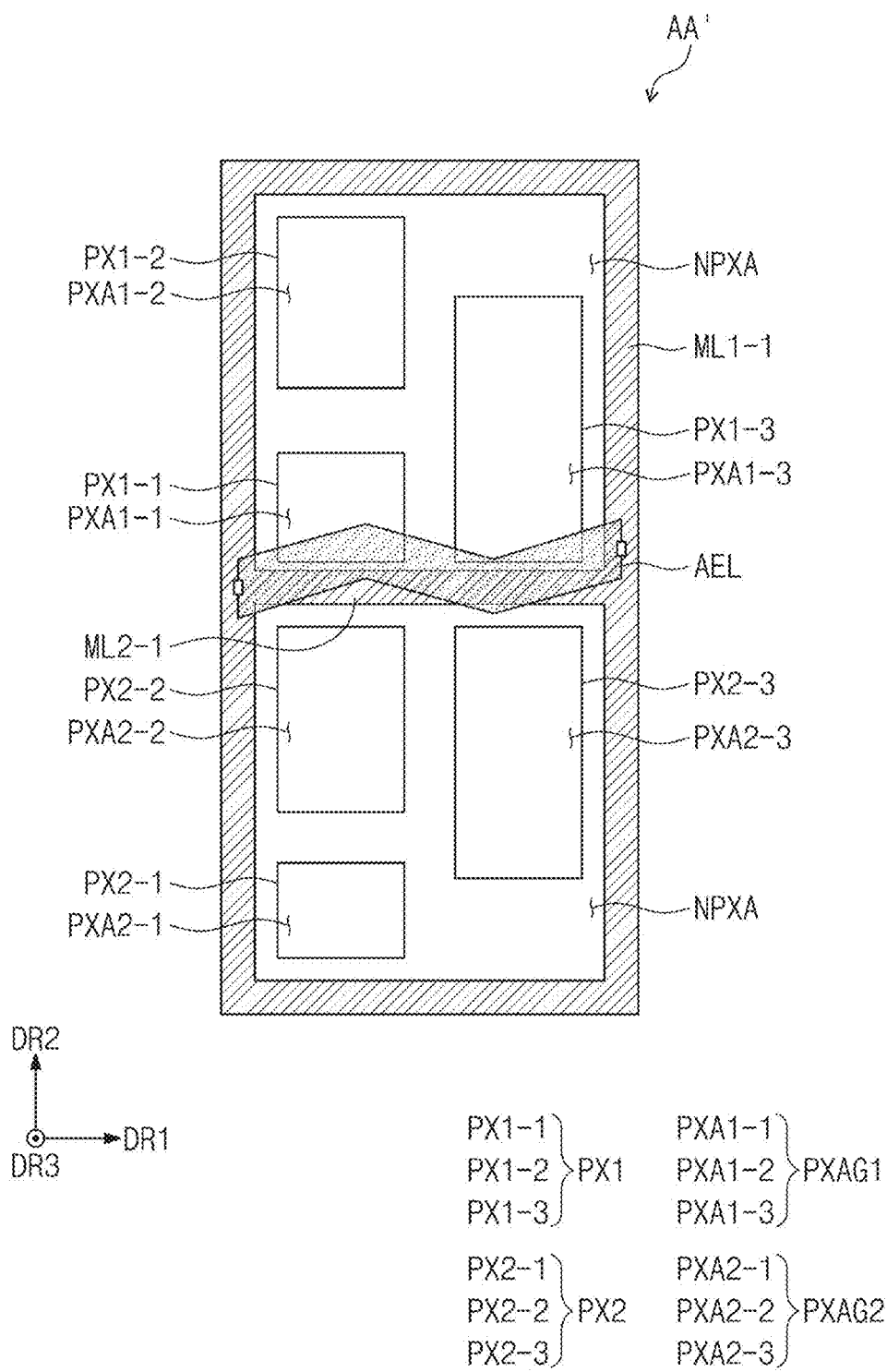
FIG. 9 is a plan view illustrating region AA' of FIG. 1 according to one or more embodiments of the present disclosure.

FIG. 9 is a plan view illustrating a region corresponding to region AA' of FIG. 1 according to one or more embodiments of the present disclosure. For the description with reference to FIG. 9, the components described with reference to FIGS. 6 and 8 will be denoted as the same reference numerals or symbols, and the descriptions thereof will be omitted.

In the sensor layer 200 (see FIG. 4) of the electronic device 1000, the sensing electrode SP (see FIG. 4) may be defined. The sensing electrode SP (see FIG. 4) may include a (1-1)-th mesh line ML1-1, a (2-1)-th mesh line ML2-1, and an auxiliary electrode AEL.

Referring to FIGS. 5 and 9, the auxiliary electrode AEL may be located on a different layer from the (1-1)-th mesh line ML1-1 and the (2-1)-th mesh line ML2-1. For example, the (1-1)-th mesh line ML1-1 and the (2-1)-th mesh line ML2-1 may be located on a first conductive layer 202, and the auxiliary electrode AEL may be located on a second conductive layer 204. The auxiliary electrode AEL may have a zigzag shape. The auxiliary electrode AEL may include transparent metal oxide, for example, indium tin oxide (ITO), indium zinc oxide (IZO), zinc oxide (ZnO), indium zinc tin oxide (IZTO), or the like.

The auxiliary electrode AEL may be electrically connected to the (1-1)-th mesh line ML1-1. When viewed on a plane, the auxiliary electrode AEL may overlap at least a portion of a first pixel group PX1, a second pixel group PX2, or the (2-1)-th mesh line ML2-1.

FIG. 9 illustrates that the auxiliary electrode AEL overlaps a (1-1)-th sub pixel PX1-1, a (1-3)-th sub pixel PX1-3, and the (2-1)-th mesh line ML2-1, but one or more embodiments of the present disclosure is not limited thereto. For example, the auxiliary electrode AEL, on a plane, may overlap only the (1-1)-th sub pixel PX1-1 and the (1-3)-th sub pixel PX1-3.

According to one or more embodiments of the present disclosure, on a plane, due to the auxiliary electrode AEL located overlapping the first pixel group PX1, the second pixel group PX2, and the (2-1)-th mesh line ML2-1, the mutual capacitance may increase between the sensing electrodes each formed as an auxiliary electrode AEL. As the mutual capacitance increases, the amount of change in mutual capacitance may increase. Therefore, the sensing sensitivity of the sensor layer 200 (see FIG. 4) may be improved.

According to what is previously described, because an electronic device has a sensing electrode which is not located in a partial region, the area of a plurality of pixels may increase. Accordingly, current density applied to the plurality of pixels may be reduced, so that the life span of each of the plurality of pixels may increase. Therefore, the reliability of the electronic device may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the technical scope of the present disclosure should not be limited to the contents described in the detailed description of the specification, but should be defined by the claims, with functional equivalents thereof to be included therein.

What is claimed is:

1. An electronic device comprising:
  a display layer comprising pixels comprising a first pixel group and a second pixel group; and
  a sensor layer above the display layer, and comprising a sensing electrode,
  wherein the first pixel group comprises:
    a (1-1)-th sub pixel configured to emit first light;
    a (1-2)-th sub pixel spaced apart from the (1-1)-th sub pixel at a first distance in a second direction, and configured to emit second light that is different from the first light; and
    a (1-3)-th sub pixel spaced apart from each of the (1-1)-th sub pixel and the (1-2)-th sub pixel at the first distance in a first direction crossing the second direction, and configured to emit third light that is different from the first light and the second light,
  wherein the second pixel group comprises:
    a (2-1)-th sub pixel configured to emit the first light;
    a (2-2)-th sub pixel adjacent the (1-1)-th sub pixel in the second direction, spaced apart from the (1-1)-th sub pixel at a second distance that is different from the first distance, spaced apart from the (2-1)-th sub pixel at the first distance in the second direction, and configured to emit the second light; and
    a (2-3)-th sub pixel spaced apart from each of the (2-1)-th sub pixel and the (2-2)-th sub pixel at the first distance in the first direction, and configured to emit the third light.

2. The electronic device of claim 1, wherein the first distance is less than the second distance.

3. An electronic device comprising:
  a display layer comprising pixels comprising a first pixel group and a second pixel group; and
  a sensor layer above the display layer, and comprising a sensing electrode,
  wherein the first pixel group comprises:
    a (1-1)-th sub pixel configured to emit first light;
    a (1-2)-th sub pixel spaced apart from the (1-1)-th sub pixel at a first distance in a second direction, and configured to emit second light that is different from the first light; and
    a (1-3)-th sub pixel spaced apart from each of the (1-1)-th sub pixel and the (1-2)-th sub pixel at the first distance in a first direction crossing the second direction, and configured to emit third light that is different from the first light and the second light, wherein the second pixel group comprises:
- a (2-1)-th sub pixel configured to emit the first light;
- a (2-2)-th sub pixel adjacent the (1-1)-th sub pixel in the second direction, spaced apart from the (1-1)-th sub pixel at a second distance that is different from the first distance, spaced apart from the (2-1)-th sub pixel at the first distance in the second direction, and configured to emit the second light; and
- a (2-3)-th sub pixel spaced apart from each of the (2-1)-th sub pixel and the (2-2)-th sub pixel at the first distance in the first direction, and configured to emit the third light, wherein the sensing electrode comprises:
- a first mesh line having a mesh structure, and surrounding the first pixel group and the second pixel group; and
- a second mesh line electrically connected to the first mesh line, between the first pixel group and the second pixel group, and extending in the first direction.

4. The electronic device of claim 3, wherein the first mesh line has a same electrode width as the second mesh line, which is less than the first distance.

5. The electronic device of claim 3, wherein, when viewed on a plane, the first mesh line and the second mesh line do not overlap the first pixel group or the second pixel group.

6. The electronic device of claim 3, wherein the first mesh line comprises a (1-1)-th protruding part which, on a plane, is between the (1-1)-th sub pixel and the (1-2)-th sub pixel, and protrudes in the first direction.

7. The electronic device of claim 6, wherein the first mesh line further comprises a (1-2)-th protruding part, which, on the plane, is between the (2-1)-th sub pixel and the (2-2)-th sub pixel, and protrudes in the first direction.

8. The electronic device of claim 7, wherein the second mesh line comprises a (2-1)-th protruding part, which, on the plane, is between the (1-1)-th sub pixel and the (1-3)-th sub pixel, and protrudes in the second direction.

9. The electronic device of claim 8, wherein the second mesh line further comprises a (2-2)-th protruding part, which, on the plane, is between the (2-2)-th sub pixel and the (2-3)-th sub pixel, and protrudes in an opposite direction of the second direction.

10. The electronic device of claim 9, wherein the (1-1)-th protruding part has a same length as the (1-2)-th protruding part, and wherein the (2-1)-th protruding part has a same length as the (2-2)-th protruding part.

11. The electronic device of claim 3, wherein, when viewed on a plane, the first mesh line and the second mesh line are not between the (1-2)-th sub pixel and the (1-3)-th sub pixel.

12. The electronic device of claim 3, wherein, when viewed on a plane, the first mesh line and the second mesh line are not between the (2-1)-th sub pixel and the (2-3)-th sub pixel.

13. The electronic device of claim 3, wherein the sensing electrode further comprises a third mesh line electrically connected to the first mesh line in the second direction, and
  wherein, when viewed on a plane, the third mesh line overlaps at least a portion of the first pixel group and at least a portion of the second pixel group.

14. The electronic device of claim 3, wherein the sensing electrode further comprises a fourth mesh line electrically connected to the first mesh line in the first direction, and
  wherein, when viewed on a plane, the fourth mesh line overlaps at least a portion of the first pixel group.

15. The electronic device of claim 3, wherein the sensing electrode further comprises a fifth mesh line electrically connected to the first mesh line in the first direction, and
  wherein, when viewed on a plane, the fifth mesh line overlaps at least a portion of the second pixel group.

16. The electronic device of claim 3, wherein the sensing electrode further comprises an auxiliary electrode electrically connected to the first mesh line, and
  wherein, when viewed on a plane, the auxiliary electrode overlaps at least a portion among the first pixel group, the second pixel group, or the second mesh line.

17. The electronic device of claim 16, wherein the auxiliary electrode has a zigzag shape.

18. The electronic device of claim 16, wherein the auxiliary electrode comprises a transparent material.

19. The electronic device of claim 1, wherein the (1-1)-th sub pixel has an area that is less than an area of the (1-2)-th sub pixel, which is less than an area of the (1-3)-th sub pixel.

20. The electronic device of claim 1, wherein the (2-1)-th sub pixel has an area that is less than an area of the (2-2)-th sub pixel, which is less than an area of the (2-3)-th sub pixel.

* * * * *